(12) United States Patent
Sollmann

(10) Patent No.: US 9,457,543 B2
(45) Date of Patent: Oct. 4, 2016

(54) ELASTOMER LAMINATE AND METHOD FOR ITS PRODUCTION

(75) Inventor: Henner Sollmann, Gronau (DE)

(73) Assignee: Mondi Consumer Packaging Technologies GmbH, Gronau (DE)

( * ) Notice: Subject to any disclaimer, the term of this patent is extended or adjusted under 35 U.S.C. 154(b) by 0 days.

(21) Appl. No.: 13/332,688

(22) Filed: Dec. 21, 2011

(65) Prior Publication Data

US 2012/0164383 A1 Jun. 28, 2012

(30) Foreign Application Priority Data

Dec. 28, 2010 (EP) .................................. 10197203

(51) Int. Cl.
- *B32B 25/08* (2006.01)
- *B29C 55/02* (2006.01)
- *B29K 609/06* (2006.01)

(52) U.S. Cl.
CPC ............. *B32B 25/08* (2013.01); *B29C 55/023* (2013.01); *B29K 2609/06* (2013.01); *B29K 2995/0072* (2013.01); *Y10T 428/24355* (2015.01)

(58) Field of Classification Search
CPC ................ B32B 25/08; B29C 55/023; Y10T 428/24355; B29K 2995/0072; B29K 2609/06
USPC .......................................................... 428/141
See application file for complete search history.

(56) References Cited

U.S. PATENT DOCUMENTS

| | | | |
|---|---|---|---|
| 6,984,439 B2 * | 1/2006 | Topolkaraev | 428/182 |
| 7,449,240 B2 * | 11/2008 | Hamulski et al. | 428/411.1 |
| 2008/0233824 A1* | 9/2008 | Abed et al. | 442/329 |

FOREIGN PATENT DOCUMENTS

| | | |
|---|---|---|
| EP | 0 500 590 | 9/1992 |
| EP | 1 316 418 | 6/2003 |
| WO | WO 2004/043695 | 5/2004 |

OTHER PUBLICATIONS

European Search Report of Application No. 10 197 203.2 dated May 13, 2011, with English translation of relevant parts.

* cited by examiner

*Primary Examiner* — Nathan Van Sell
(74) *Attorney, Agent, or Firm* — Collard & Roe, P.C.

(57) ABSTRACT

An elastomer laminate has an elastomer carrier layer composed of a thermoplastic elastomer, and at least one microtextured cover layer composed of a polymer that has a lower elasticity than the material of the carrier layer. The microtexture is produced by stretching the laminate beyond the elasticity limit of the cover layer and elastic recovery of the stretched laminate. The microtextured cover layer contains a plurality of pores.

8 Claims, 6 Drawing Sheets

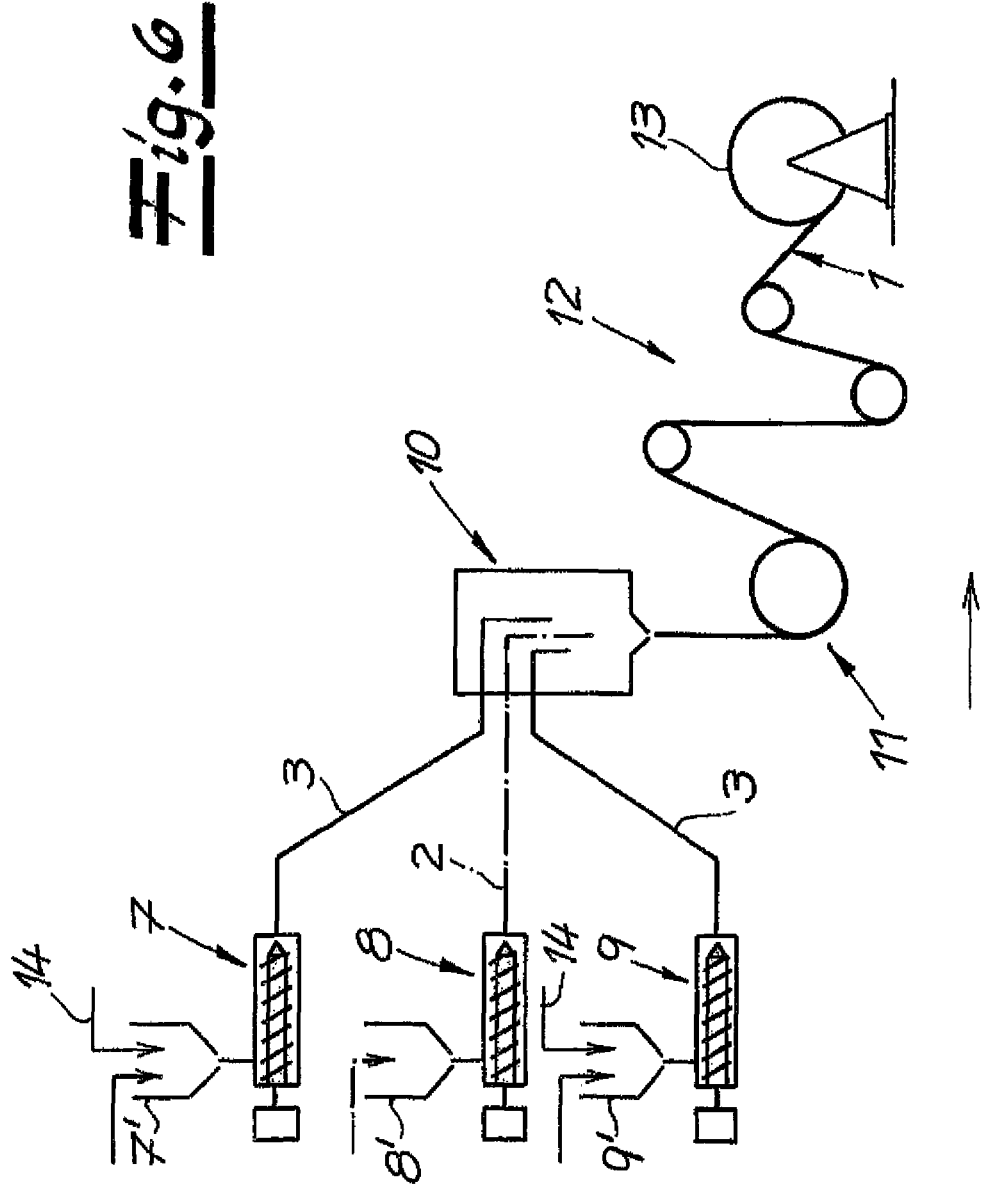

ELASTOMER LAMINATE AND METHOD FOR ITS PRODUCTION

CROSS REFERENCE TO RELATED APPLICATIONS

Applicant claims priority under 35 U.S.C. §119 of European Application No. 10 197 203.2 filed Dec. 28, 2010, the disclosure of which is incorporated by reference.

BACKGROUND OF THE INVENTION

1. Field of the Invention

The invention relates to an elastomer laminate having an elastic carrier film composed of a thermoplastic elastomer and at least one microtextured cover layer composed of a polymer that has a lower elasticity than the material of the carrier layer. The microtexture has been formed by stretching the laminate beyond the elasticity limit of the cover layer, and elastic recovery of the stretched laminate. The elastomer laminate is used, for example, in disposable hygiene products, and is used, for example, as an elastic waistband or as an elastic closure element on a diaper.

2. The Prior Art

An elastomer laminate having the characteristics described above is described in European Patent No. EP 0 500 590 B1. The cover layer forms a relatively rigid layer that possesses only a little elasticity, and consists, for example, of a polyolefin, particularly polyethylene or polypropylene, a polyethylene terephthalate or polyacrylate. The cover layer of the elastomer laminate has a microtexture that has been produced by stretching the laminate beyond the elasticity limit of the cover layer. The microtexture consists of small wrinkles that form during elastic recovery of the elastomer laminate after stretching, and the orientation of the wrinkles is dependent on the stretching direction. The laminate can be stretched uniaxially transverse to the machine direction, or biaxially. The microtexture is perceived as a roughened, soft surface texture.

A film coextrudate that has an elastomer carrier layer and at least one cover layer composed of a more rigid polymer is described in European Patent Application No. EP 1 316 418 A1. The cover layer consists of a thermoplastic plastic having a brittle consolidated molecular structure that is elongated only slightly when an elongation force is applied, and tears, without any transition, when a predetermined tear force is exceeded. The brittle consolidated molecular structure is irreversibly broken up by uniaxial stretching transverse to the extrusion direction, which is referred to as activation. As a result, the laminate can be elastically elongated transverse to the extrusion direction. The cover layer can consist of a polyolefin that has been made brittle by subsequent treatment, a mixture of polyolefin and polystyrene, or a mixture of polyolefin, polystyrene and ethylene vinyl acetate. In the extrusion direction, which is also referred to as the machine direction, the brittle consolidated molecular structure is maintained and makes the material rigid. The laminate does not have any elasticity in the machine direction.

SUMMARY OF THE INVENTION

It is therefore an object of the invention to improve the elastic properties of the laminate. In particular, the laminate is also supposed to be elastically and reversibly elongatable in the extrusion or machine direction.

Proceeding from an elastomer laminate having the characteristics described initially, this object is accomplished, according to the invention, in that the microtextured cover layer contains a number of pores. The pores are preferably uniformly distributed in the cover layer. They represent planned breaking points when the laminate is stretched, at which the cover layer bursts open. Uniform and finely distributed weakening in many small zones is achieved by a uniform distribution of the pores. The laminate is given elastic properties and, at the same time, a microtextured cover layer, by stretching the laminate, which is also referred to as activation. The pores in the cover layer improve the elastic properties of the laminate. The laminate can be reversibly elongated, to a great extent, after its activation, whereby a remaining irreversible component can be reduced by means of the pore structure of the microtextured cover layer. The pores furthermore bring about an improved microtexture of the cover layer.

A multilayer film produced by coextrusion, for example, which has an elastomer carrier layer and a nonporous cover layer composed of a rigid polymer, tears very quickly when stretched in the machine direction. Such a material has a low stretching limit. This is due to the orientation of the macromolecules, which occurs during extrusion. The strength of the nonelastomer cover layer is significantly greater in the machine direction than in the transverse direction. This leads to the result that if the ultimate strength and the ultimate elongation are exceeded locally, the elongation limit of the entire coextrusion film is exceeded and the laminate will tear. The laminate demonstrates brittle behavior in the machine direction. In contrast, an elastomer laminate according to the invention, which has a slightly foamed cover layer having a plurality of pores, acts significantly more homogeneously. When the laminate according to the invention is elongated, a uniform microstructure occurs, having a plurality of planned breaking points. The laminate according to the invention can therefore be mechanically activated in the machine direction, by stretching, because of its structure. It can be elongated by at least 50%, preferably more than 100%, in the machine direction, whereby the irreversible component of the elongation amounts to less than 20%, preferably less than 10%, with reference to the original length of the laminate, when the stress on the laminate is relieved.

The microtextured cover layer that contains pores can have different structures, whereby mixed forms of the structures explained below are also possible. The structures that occur are also determined in accordance with the thickness of the cover layer. In the case of a very great layer thickness, the microtextured cover layer can have a porous foam structure, whereby the pores of the foam structure are at least partly smaller than the thickness of the extruded cover layer before stretching of the laminate. In the case of a low layer thickness of the cover layer, a cell structure consisting of a polymer matrix and pores that extend at least in part over the entire thickness of the cover layer is primarily formed. The microtexture that forms after the laminate is stretched beyond the elasticity limit of the cover layer therefore comprises wrinkles and pores that open at the surface of the cover layer and form cavities and/or gaps. In the end result, a roughened surface occurs, which feels pleasant upon contact with the skin.

The cover layer of the laminate according to the invention preferably has a thickness, measured before stretching of the laminate, between 1 µm and 20 µm. The carrier layer can have a thickness between 15 µm and 150 µm, also measured before stretching.

The elastomer carrier layer can consist of a block copolymer, selected from the group of PEBA block copolymers, the olefin block copolymers, or the styrene block copolymers, particularly the SIS, SBS, SEBS, or SIBS block copolymers, of an elastomer polyurethane, or of an elastomer ethylene copolymer. The cover layer can particularly consist of a polyolefin, polystyrene, polyamide, polycarbonate, polymethylmethacrylate (PMMA), polyoxymethylene (POM), polyethylene terephthalate (PET), polybutylene terephthalate (PBT). Polymer mixtures of polyolefin, polystyrene, and ethylene vinyl acetate or ethyl butyl acrylate and polystyrene are furthermore suitable for the cover layer.

The microtexture can be formed by uniaxial stretching of the laminate in the extrusion direction, i.e. in the machine direction, or by means of biaxial stretching of the laminate.

The object of the invention is also a method according to claim 10 for the production of the elastomer laminate described. In the method according to the invention, a coextrudate having a carrier layer composed of a thermoplastic elastomer and at least one microtextured cover layer composed of a polymer that has a lower elasticity is produced. The coextrudate is furthermore stretched beyond the elasticity limit of the cover layer, and subsequently relaxed, in order to produce a microstructure in the cover layer. According to the invention, the polymer for the cover layer is mixed with a propellant that expands during melting and extrusion of the polymer and forms pores in the cover layer of the coextrudate. Preferably, a chemically endothermal propellant is used that forms a gas at a temperature between 150° C. and 250° C., by means of a chemical reaction. Because an endothermal propellant consumes energy during its decomposition reactions, the gas development stops after heat is no longer supplied. The gas development and therefore also the pore formation can be well controlled by the amount of propellant, the distribution of the propellant in the polymer melt, and by the temperature management during extrusion. The propellant can particularly be processed as a granulate in the form of a master batch having a propellant concentration between 10 and 70 wt.-% with reference to the master batch amount. A suitable endothermal propellant is based, for example, on $NaHCO_3$ and citric acid. This propellant is suitable for foaming up polyolefins (PE, PP), polyamide, and polystyrene, among others.

After extrusion, the coextrudate is cooled and later stretched uniaxially in the machine direction or biaxially. Stretching can take place immediately after extrusion and cooling. Frequently, however, it is advantageous to undertake stretching only during further processing, because then, the outer layers at first guarantee great rigidity in the machine direction, thereby allowing or at least facilitating winding the coextrudate onto a roll or unwinding it, and preventing the wound-up coextrudate from sticking together. Stretching can take place, for example, when the coextrudate, wound up onto a roll, has been delivered and elastic closure elements of a diaper have been produced from it, for example by means of lamination with a nonwoven material. Depending on the type of use, the microtexturing can also be of importance for the haptics and the appearance, particularly if the coextrudate is laminated to a nonwoven only on one side. The coextrudate then forms an outside, in the case of the laminate that is produced, so that a comfortably soft, textile-like surface is formed by the microtexture.

Stretching is also referred to as mechanical activation. The material is given its elastic elongation properties as well as an external microtexture by means of activation. The laminate can particularly have a multilayer structure with an elastomer carrier layer as the core layer on both sides of the laminate microtextured cover layers having the characteristics according to the invention.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 6 shows a method for the production of the laminate.

DETAILED DESCRIPTION OF THE PREFERRED EMBODIMENT

Figure 1:
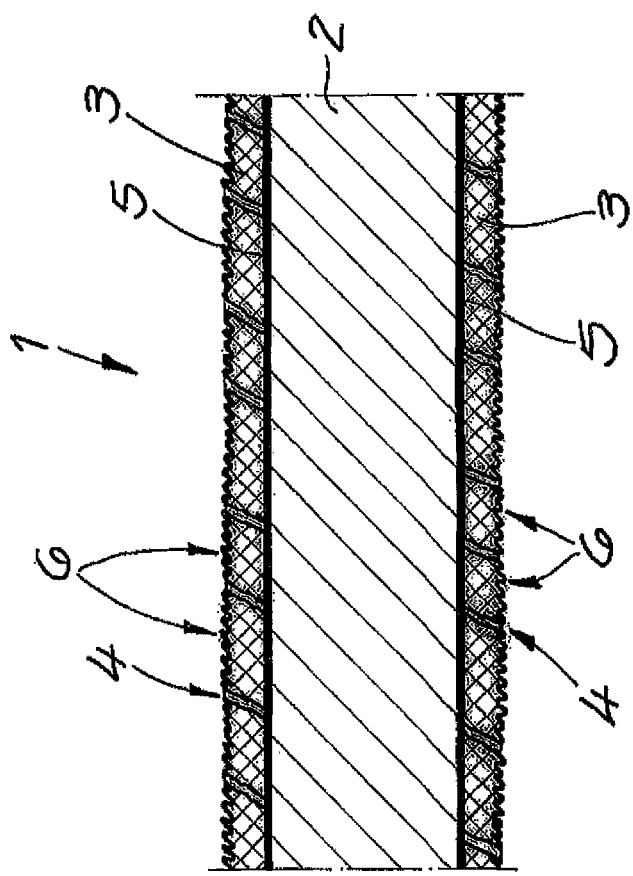
FIG. 1 shows a section through an elastomer laminate.

Referring now in detail to the drawings, laminate 1 shown in section in FIG. 1 has an elastomer carrier layer 2 composed of a thermoplastic elastomer and a microtextured cover layer 3 on both sides of the carrier layer. Microtextured cover layers 3 each consist of a polymer, which demonstrates a lower elasticity than the material of carrier layer 2. The microtexture of laminate 1 has been formed by stretching laminate 1 beyond the elasticity limit of cover layers 3, and elastic recovery of the stretched laminate 1. Microtextured cover layers 3 contain a plurality of pores 4 that are distributed essentially uniformly in the cover layer. Optionally, adhesion-imparting layers 5 can be disposed between elastomer carrier layer 2 and cover layers 3.

Elastomer carrier layer 2 preferably consists of a block copolymer selected from the group of SIS, SBS, SEBS, SIBS, or PEBA block copolymers. It can contain additions of non-elastic polymers and/or processing aids as well as additives.

Cover layers 3 consist of a polymer that has a lower elasticity than the material of elastomer carrier layer 2. In particular, polyolefins, polystyrene, polyamide, polycarbonate, PMMA, POM, polyethylene terephthalate, PBT or also mixtures of polyolefins, polystyrene, and ethylene vinyl acetate or mixtures of ethyl butyl acrylate and polystyrene are possibilities as polymers for cover layers 3. The cover layers have a thickness, preferably measured before stretching, between 1 μm and 20 μm. The thickness of the elastomer carrier layer, also measured before stretching, preferably lies in the range between 15 μm and 150 μm.

Figure 2:
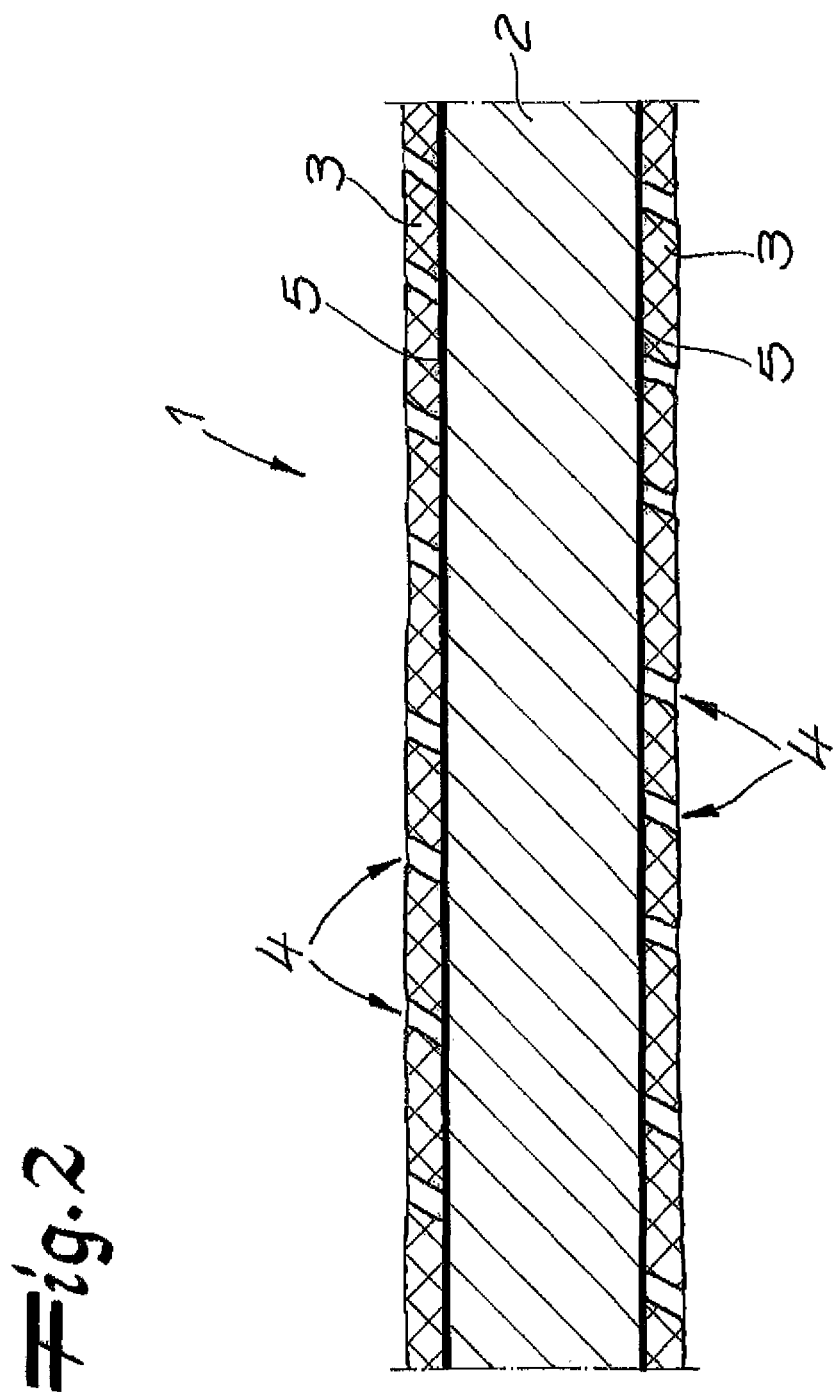
FIG. 2 shows a section through the laminate in the elongated state.
Figure 3:
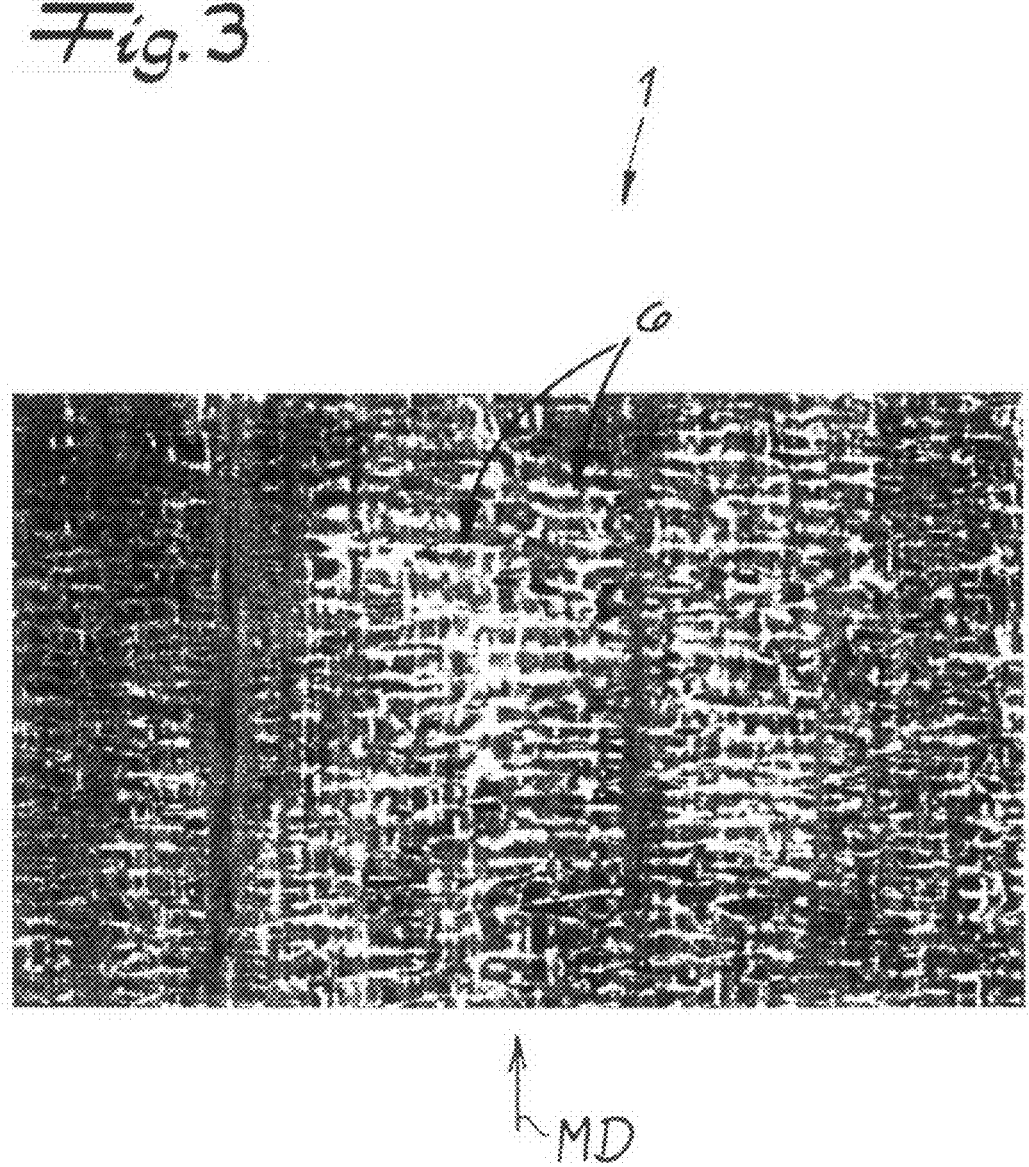
FIG. 3 shows the surface of the laminate shown in FIG. 1.
Figure 4:
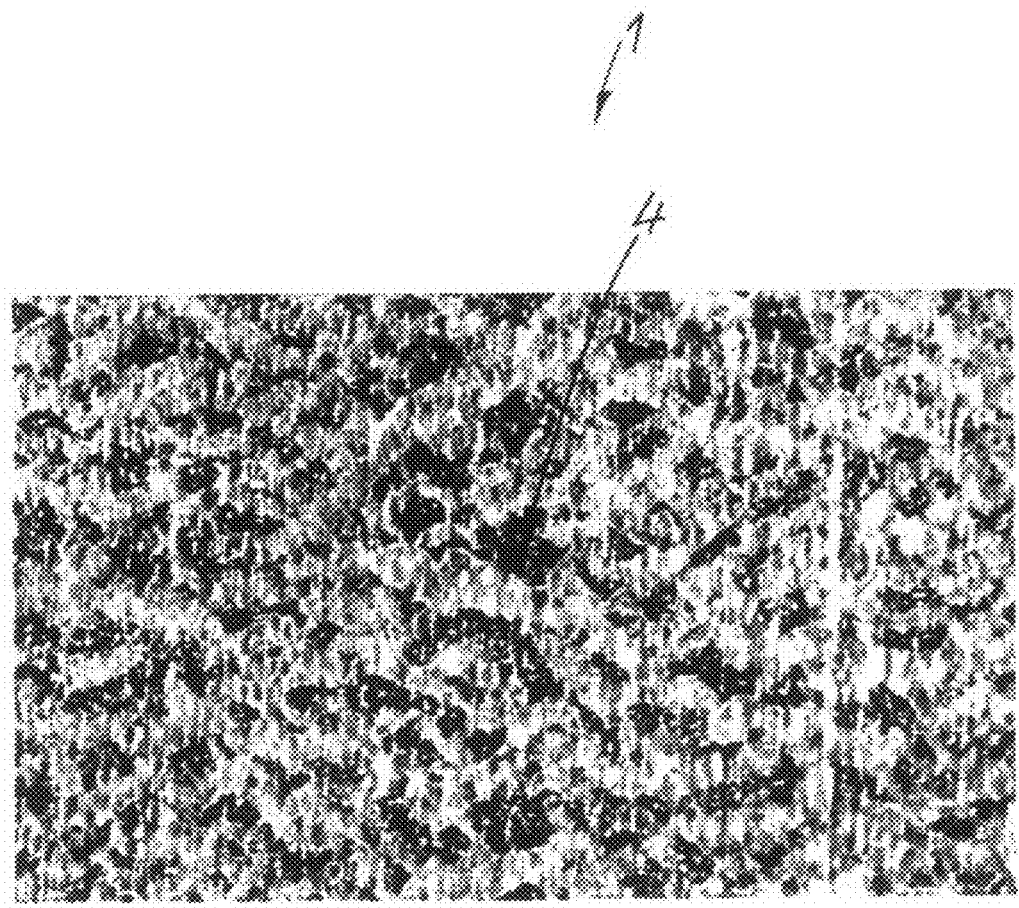
FIG. 4 shows the surface of the laminate in the elongated state.

Pores 4 contained in cover layers 3 extend at least in part over the entire thickness of cover layer 3. A cell structure is formed, consisting of a polymer matrix and pores. FIGS. 1 and 3 show laminate 1 in the relaxed, i.e. non-elongated state, while FIGS. 2 and 4 show the structure of the film of laminate 1 in an elongated state. It can be seen from a comparative view of the elongated and non-elongated state that pores 4 become larger when laminate 1 is elongated. The surface contains depressions and elevations. In the relaxed state, one can furthermore see wrinkles 6 that have formed during stretching of laminate 1 beyond the elasticity limit of the cover layer, and elastic recovery of stretched laminate 1. This process is also referred to as activation. The microtexture is composed of wrinkles and pores that are open toward the surface. This results in a roughened surface having a textile-like character.

The structure and the placement of wrinkles 6 that have formed during stretching of the laminate 1 beyond the elasticity limit of the cover layer is dependent on the stretching direction. The surface shown in FIG. 3 has been formed by means of uniaxial stretching in the machine direction (MD).

Figure 5:
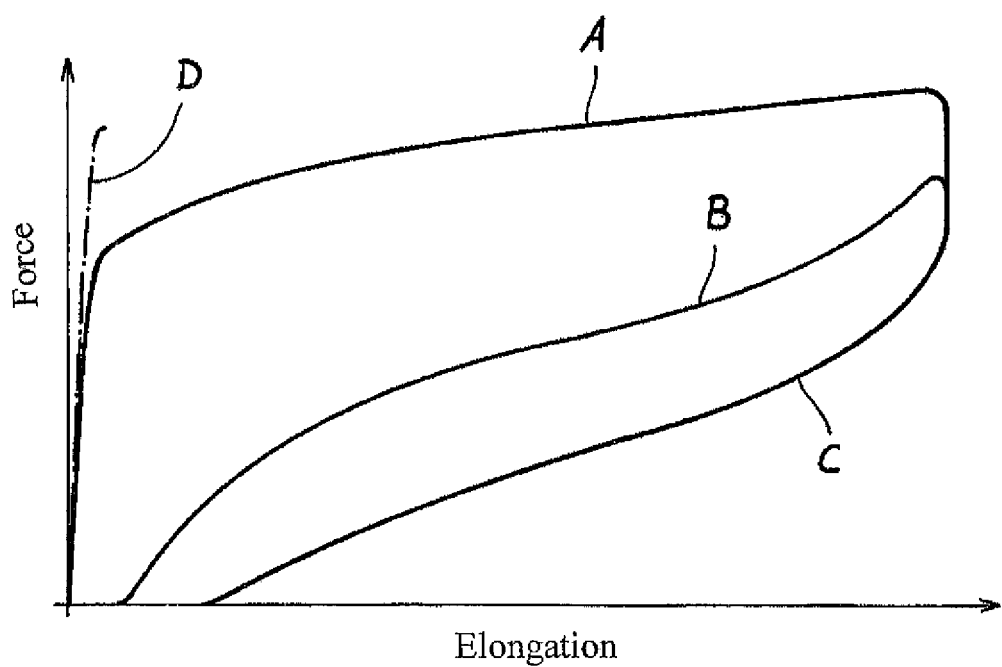
FIG. 5 shows an elongation diagram that characterizes the elongation of the laminate in the machine direction.

The elongation characteristics of elastomer laminate 1 are shown in FIG. 5. The elongation force is plotted as a function of the elongation of laminate 1, whereby curve A shows the elongation force progression during first-time stretching, and curve B shows the elongation force progression during second and subsequent elongation. Curve C shows the elongation force progression of laminate 1 during relaxation or recovery that follows elongation. From a comparative view of curves A and B, one can see that the irreversibly remaining elongation of the elastomer laminate after first-time stretching of the material is slight, and amounts to about 10% in the case of the film being studied. The elongation force progression D of a three-layer elastomer laminate whose cover layers do not contain any pores is shown qualitatively for comparison. When elongated in the machine direction (MD), the material already tears at a slight elongation of less than 20%.

FIG. 6 shows a method of production for elastomer laminate 1. In the method shown in FIG. 6, a coextrudate having a carrier layer 2 composed of a thermoplastic elastomer and outer cover layers 3 are produced by means of multilayer extrusion. Outer cover layers 3 each consist of a polymer that has a lower elasticity than the material of carrier layer 2. A usual extruder system is used for coextrusion; it has multiple extruders 7, 8, 9 with related raw material containers 7', 8', 9' as well as an extruder head 10 with an extruder nozzle for extrusion of a multilayer flat film. The coextrudate is passed over a cooling roller 11 and subsequently stretched beyond the elasticity limit of cover layers 3 in a stretching device 12. Stretching takes place in the machine direction MD. Elastomer laminate 1 is subsequently relaxed again and wound up onto a roll 13.

Polymers or polymer mixtures are passed to the raw material containers 7', 9' of the extruders 7, 9 for the cover layers 3; these form relatively rigid layers that can be elongated only a little. The polymer for cover layers 3 is mixed with a propellant that is fed in as a master batch 14, for example in granulated form. The propellant expands during melting and extrusion of the polymer and forms pores in cover layers 3 of the coextrudate. A chemically endothermal propellant is used, which forms gases at a temperature between 150° C. and 250° C., by means of a chemical reaction.

To produce elastomer carrier layer 2, an elastomer polymer or a polymer mixture that contains a thermoplastic elastomer as a significant component is fed to the raw material container 8' of extruder 8.

FIGS. 3 to 5 relate to a coextrusion film having the following layer structure:

a) an elastomer carrier layer consisting of 75 wt.-% SBS, 12 wt.-% polystyrene, and 13 wt.-% processing aid(s) and additives, having a layer thickness of 85 µm, measured before stretching of the laminate;

b) cover layers consisting of 92 wt.-% polystyrene and 8 wt.-% master batch that contains a chemically endothermal propellant. Approximately 30 to 50 wt.-% propellant are contained in the master batch. The cover layers have a layer thickness of approximately 5 µm.

The coextrudate is stretched beyond the elasticity limit of the cover layers, in the machine direction (MD), in order to produce a microtexture. The microtexture shown in FIG. 3 forms on the surface of the cover layers, by means of elastic recovery.

Accordingly, while only a few embodiments of the present invention have been shown and described, it is obvious that many changes and modifications may be made thereunto without departing from the spirit and scope of the invention.

What is claimed is:

1. An elastomer laminate comprising:
   a single elastomer carrier layer composed of a thermoplastic elastomer, and
   a single layer or at most two layers having a microtexture and being composed of a polymer that has a lower elasticity than a material of the single carrier layer, said single layer or at most two layers containing a plurality of pores, forming a cover layer or cover layers of the elastomer laminate such that the single layer or at most two layers form at least one exterior surface of the elastomer laminate, and said single layer or at most two layers consisting of a foam structure with ruptured pores,
   wherein the microtexture consists of wrinkles and pores that are open toward the exterior surface and is produced by stretching the laminate beyond an elasticity limit of the cover layer or cover layers and elastic recovery of the stretched laminate.

2. The elastomer laminate according to claim 1, wherein the pores are uniformly distributed in the cover layer or layers.

3. The elastomer laminate according to claim 1, wherein the pores of the foam structure are smaller than a thickness of the cover layer or layers before stretching of the laminate.

4. The elastomer laminate according to claim 1, wherein the cover layer or layers has a thickness, measured before stretching of the laminate, between 1 µm and 20 µm, and wherein the carrier layer has a thickness between 15 µm and 150 µm, also measured before stretching.

5. The elastomer laminate according to claim 1, wherein the carrier layer consists of a block copolymer, selected from the group consisting of SIS, SBS, SEBS, and PEBA block copolymers, or of an elastomer polyurethane, or of an elastomer ethylene copolymer.

6. The elastomer laminate according to claim 1, wherein the cover layer or layers consists of a polyolefin, polystyrene, polyamide, polycarbonate, PMMA, POM, polyethylene terephthalate, PBT, or a mixture of polyolefins, polystyrene, and ethylene vinyl acetate or of a mixture of ethyl butyl acrylate and polystyrene.

7. The elastomer laminate according to claim 1, wherein the microtexture is formed by uniaxial stretching of the laminate in an extrusion direction.

8. The elastomer laminate according to claim 1, wherein the microtexture is formed by biaxial stretching of the laminate.

* * * * *